Feb. 28, 1956 W. B. HINES 2,736,365
PORTABLE FOLDING SEAT
Filed May 9, 1952 2 Sheets-Sheet 2
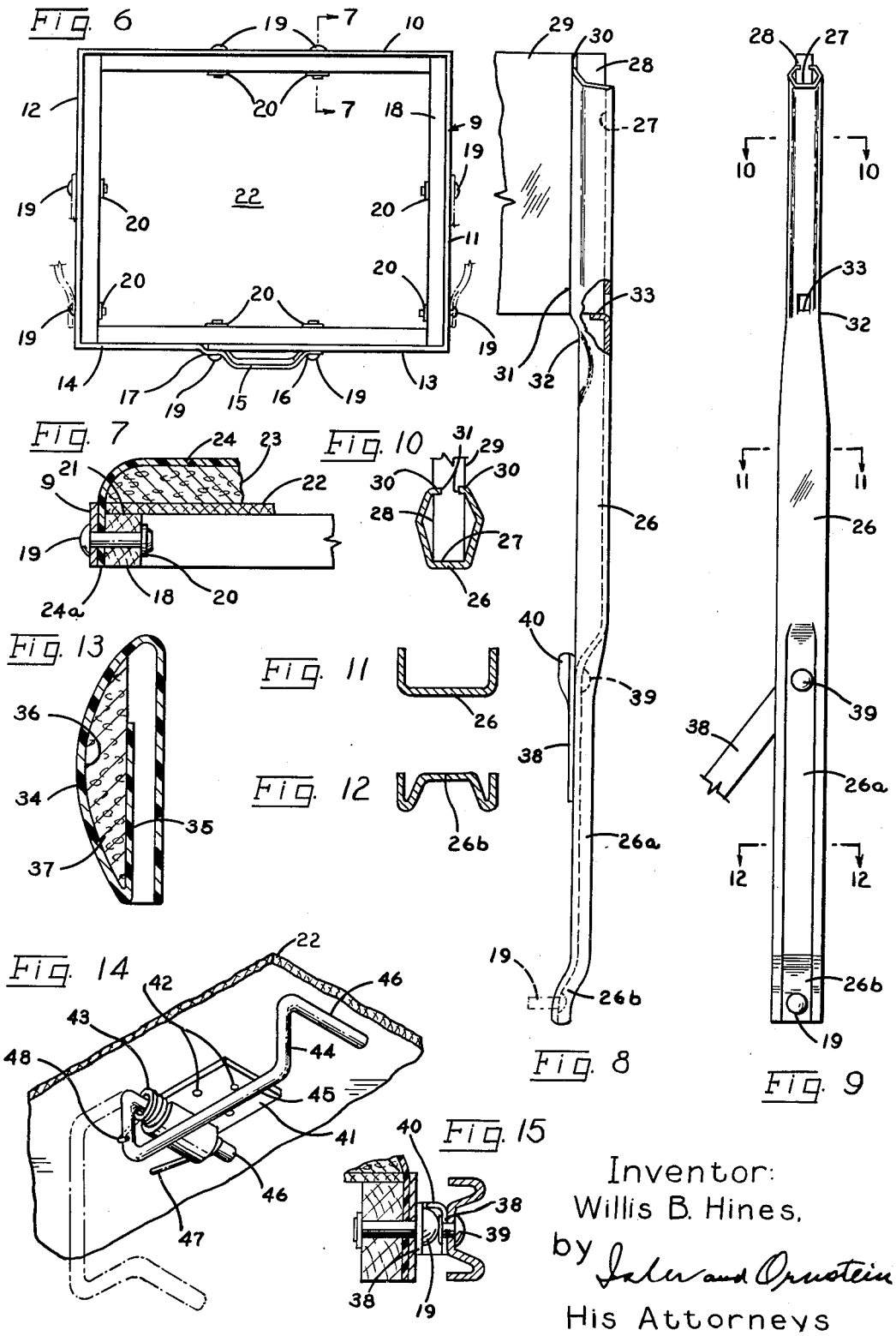
Inventor:
Willis B. Hines,
by Saler and Ornstein
His Attorneys United States Patent Office 2,736,365
Patented Feb. 28, 1956

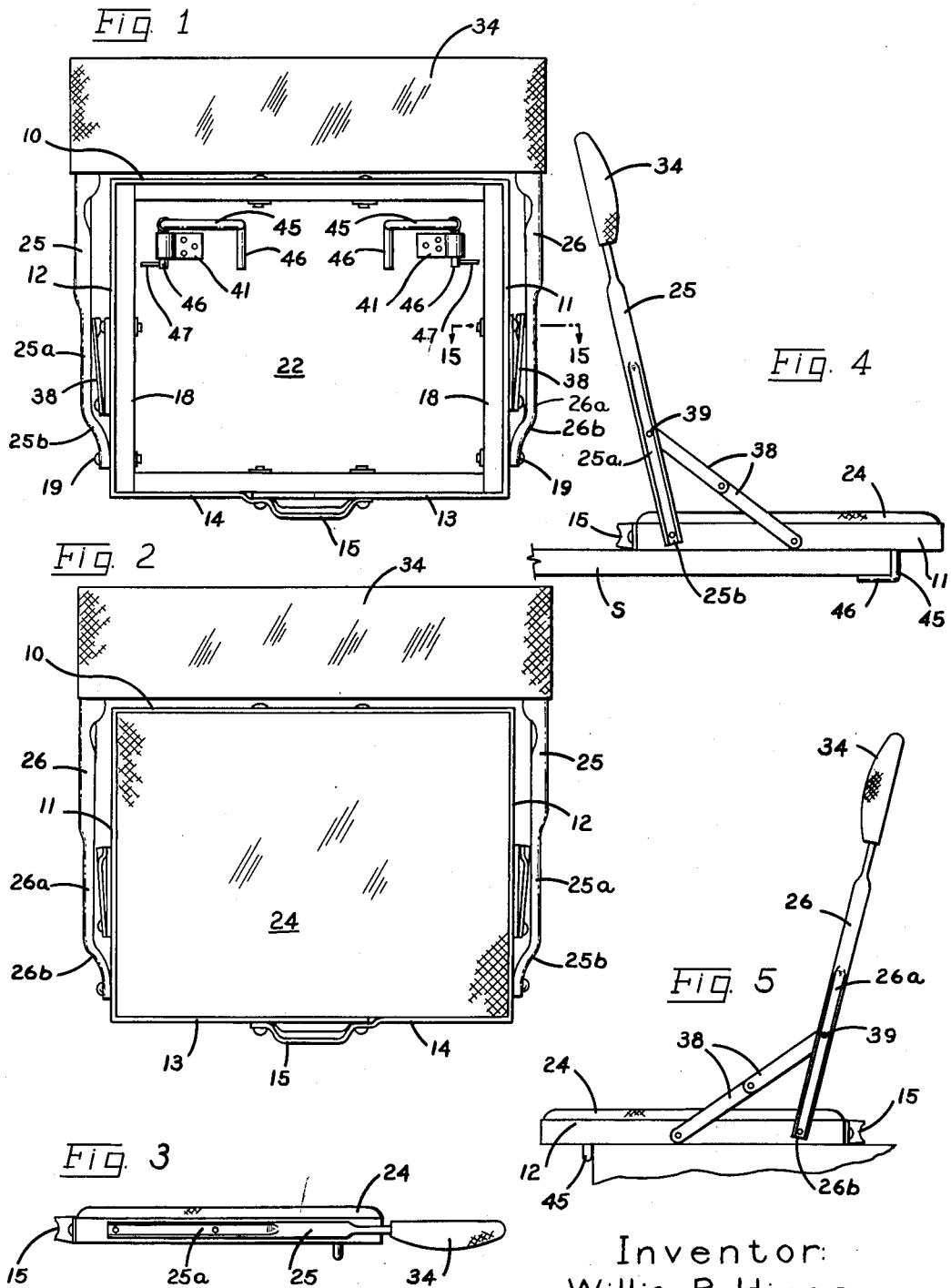

2,736,365
PORTABLE FOLDING SEAT

Willis B. Hines, Canton, Ohio, assignor to Herbert S. Freed, doing business as H. S. Freed & Co., Canton, Ohio Application May 9, 1952, Serial No. 286,962

3 Claims. (Cl. 155—133)

This invention relates generally to portable folding seats.

In my prior Patents Nos. 2,220,865 and 2,528,433, there are disclosed portable folding seats which are especially adapted for use in stadiums, gymnasiums, row boats and other places provided with seats constructed of concrete, iron or wood without back supporting means.

The seats described in said patents have certain inherent disadvantages, including the following:

(a) In both patents, the seats are devoid of a carrying handle for carrying the seat when the latter is in a folded or collapsed condition.

(b) In Patent No. 2,528,433, extraneous fastening means, such as screws, are required to fasten the base of the back to the lever arms.

(c) In Patent No. 2,528,433, the pad or cushion 39 is cemented or otherwise permanently fixed to the front face of the back 37, and cannot be removed for cleaning or replacement without injury to the back.

(d) In Patent No. 2,528,433, no provision is made for preventing the seat from being pushed rearwardly past the lever arms, the absence of such means permitting the seat to be moved to unfolded or open position, but with the bottom of the seat facing upwardly, a condition which is a frequent source of annoyance to the user of the seat.

(e) In Patent No. 2,220,865, the bearing plates 27 and associated portions of the clamping mechanism are disposed below the plane of the lower edge of the bottom 10, a condition which places the weight of the user on these parts so as to cause possible injury or damage, thereto, besides exposing the parts to possible injury or damage.

The present invention has as its primary object, the provision of a portable folding seat of the character described, which overcomes all of the aforesaid short comings and disadvantages.

More specifically, the invention has in view the provision of a portable folding seat in which (a) A novel carrying handle is provided which is formed integrally with the seat frame, and which is secured to the frame by means of rivets which constitute the sole means for maintaining the frames, handle, base, cushion and covering in assembled condition, (b) A back construction is provided, in which the base and lever arms are locked together as a unit, without the use of extraneous fastening means, (c) A slip cover is provided having a pocket in which the pad or cushion is loosely disposed, so as to render the slip cover and cushion removable as a unit from the base of the back, and the cushion removable from the slip cover to permit replacement of the cushion when it becomes packed or unfit for use, (d) Means are provided for preventing the seat from being pushed rearwardly past the lever arms when the seat is folded, and (e) A novel compact construction and arrangement of the clamping members is provided.

Other objects and advantages of my invention will be apparent during the course of the following description.

In the accompanying drawings forming a part of this specification and in which like numerals are employed to designate like parts throughout the same, Fig. 1 is a front elevational view of a portable seat embodying the features of the invention, the seat being in the folded condition;

Fig. 2 is a rear elevational view of the seat, in folded condition;

Fig. 3 is a side elevational view of the seat, in folded condition, as viewed from the left side of Fig. 1 and right side of Fig. 2;

Fig. 4 is a side elevational view of the seat, in unfolded condition, and showing the seat clamped to a bleacher seat or bench or the like;

Fig. 5 is a side elevational view of the seat, in unfolded condition, and showing the use of the seat on a surface to which the seat cannot be clamped;

Fig. 6 is a plan view of the bottom of the seat proper, with the clamps omitted;

Fig. 7 is a fragmentary cross-sectional view, taken on the line 7—7 of Fig. 6;

Fig. 8 is a front elevational view of the lever arms which comprises the back of the seat, and showing also the manner in which the base of the back is connected to the lever arm;

Fig. 9 is a side elevational view of the lever arm shown in Fig. 8;

Fig. 10 is a fragmentary cross-sectional view, taken on the line 10—10 of Fig. 9;

Fig. 11 is a fragmentary cross-sectional view, taken on the line 11—11 of Fig. 9;

Fig. 12 is a fragmentary cross-sectional view, taken on the line 12—12 of Fig. 9;

Fig. 13 is a vertical cross-sectional view through the slip cover and cushion pad;

Fig. 14 is a fragmentary perspective view, showing one of the clamping members and the manner in which it is mounted on the seat base, and Fig. 15 is a fragmentary cross-sectional view, taken on the line 15—15 of Fig. 1.

Referring more particularly to the drawings, the portable seat will be seen to comprise a seat frame, generally designated by reference numeral 9, formed from a single strip of metal to provide a front 10 and sides 11 and 12. One end of the strip extends from the rear edge of the side 11 to a point slightly less than two-thirds of the distance from the rear edge of the side 11 to the rear edge of the side 12, to thereby form a portion 13 of the back of the seat frame 9. The other end of the strip extends from the rear edge of the side 11 to the other end of the strip, to thereby form a second portion 14 of the back of the seat frame 9. At the juncture of the portion 14 with the portion 13, the strip is bent to provide a handle 15 having end flanges 16 and 17 which overlie the portion 13 of the back of the seat frame 9. The handle 15 may be transversely curved, as shown to facilitate gripping thereof.

The handle 15 is thus formed from the same single strip of metal used to form the seat frame 9 and is therefore an integral part of the seat frame, while, at the same time, it acts as a reinforcement for this seat frame. This handle is used to carry the seat, when the latter is in folded or collapsed condition.

The seat further includes an inner frame 18, formed of strips of wood, which are secured to the metal frame 9 as by means of rivets 19 and washers 20, the lower surface of the frame 18 being substantially flush with the lower edge of the metal frame 9, and the wooden frame being of slightly less height than the metal frame, thereby forming a horizontal seat 21 for the base 22 of the seat proper. The base 22 is in the form of a rectangular board of a hard fibrous material such, for example, as Masonite, having a pad or filler 23 of upholsterer's wool, sponge rubber or other suitable cushion material mounted upon its upper surface and covered by any suitable waterproof material, such as flexible plastic, indicated by reference numeral 24.

The covering 24 and filler 23 are secured to the seat proper, as by inserting marginal portions 24a of the covering 24 between the metal frame 9 and the wooden frame 18, the rivets 19 passing through the portions 24a to thereby maintain the covering in stretched condition, providing a smooth, comfortable seat.

It may be noted that two of the rivets 19 pass through the end flanges 16 and 17 of the handle and the portion 13 of the metal seat frame. These rivets therefore serve not only to maintain the metal frame 9 in the rectangular form into which it is bent or formed, but to rigidly secure the handle 15 in position and to the frame parts.

The base 22 is of such size as to just fit within the rectangular metal frame 9 and rests upon the seat 21 of the wooden frame 18. The rivets 19 thus constitute the sole means for maintaining the frames 9 and 18, handle 15, base 22, cushion 23 and covering 24 in assembled condition. This is an important feature of the invention, since it enables the seats to be produced commercially in large quantities and at relatively low cost.

The back of the seat comprises a pair of lever arms 25 and 26, each of which is formed from a length of metal of channel-shaped cross-section.

Each channel is reinforced as by indenting web portions thereof inwardly, as at 25a and 26a, and the lower ends of these reinforced portions of the channels are bent or offset inwardly to provide portions 25b and 26b for pivotal connection to the rear portions of the sides 11 and 12 of the frame 9, the channels being pivotally connected to the rearmost rivets 19 which extend through the sides 11 and 12.

The upper end of each of the lever arms 25 and 26 is bent or formed to provide relatively deep recesses or passageways 27, open at the top, and adapted to receive end or marginal portions 28 of the base 29 of a back rest. The base 29 is preferably formed from a strip of Masonite or like material, and is provided at the front and rear with grooves 30, which delimit the ends 28 from the rest of the base 29.

The grooves 30 receive portions of inturned flanges 31 of the lever arms 25 and 26, and in assembling the base 29 with the lever arms 25 and 26, these flanges are firmly pressed into engagement with the bases of the grooves 30, so as to provide a tight frictional grip of the flanges 31 with the base 29, which grip is such as to preclude removal of the base 29 from the lever arms in an upward direction, except by extreme force. This pressure is effected, in part, by squeezing the flanges 31 together just below the base 29, as indicated at 32.

In order to prevent downward movement of the base 29 relatively to the lever arms, the metal of the lever arms is stamped to provide inwardly extending lugs 33 which form stops engaging the lower edge of the base 29.

It may be noted that by virtue of the entry of portions of the flanges 31 in the grooves 30 of the base, the lever arms cannot spread outwardly from the ends of the base 29, so that, in effect, the base 29 and lever arms 25 and 26 are locked together as a unit, and without the use of extraneous fastening means such as rivets, screws, bolts, nuts or the like. This, accordingly, is a second important feature of the invention.

The back rest further includes a slip cover 34, preferably made of the same material and of the same color as the covering 24. The slip cover is in the form of an envelope, open at the bottom, and is adapted to be detachably mounted over the base 29 and upper ends of the lever arms.

The slip cover 34 is provided with an upwardly extending flange 35, forming a pocket 36, within which is loosely disposed a pad or cushion 37 of any suitable cushion material.

The slip cover and cushion are thus removable as a unit from the base 29 and upper ends of the lever arms, and the cushion or pad 37 is removable from the slip cover, so as to permit replacement thereof when it becomes paced or unfit for use. The cushion is disposed forwardly of the base 29 and yet is not cemented to the latter, as in my previous Patent No. 2,528,433, while the slip cover and cushion are removable from the base as a unit, the slip cover covers the cushion, and the cushion is removable from the slip cover. This is a third important feature of the invention.

For the purpose of limiting the opening movement of the back, a pair of pivoted links 38 is pivotally connected to each of the sides 11 and 12 of the seat frame 9, as to the rivets 19 which extend through these sides intermediate the front and rear ends thereof. These links are also pivotally connected to the adjacent lever arms 25 and 26, as by means of rivets 39.

The links 38 are foldable into parallelism with each other so as to permit the seat to be moved to the folded position shown in Figs. 1, 2 and 3, in which position the lever arms 25 and 26 lie along side of the sides 11 and 12 respectively of the frame 9, with the back rest positioned just above the front 10 of the frame 9 and in the normal plane thereof, whereby the portable seat when folded occupies a minimum of space and may be easily carried by means of the handle 15 or stored in a small space.

When the seat is moved to its folded position, as described above, the rounded heads of the rivets which pivotally connect the links 38 with the sides 11 and 12 of the frame 9, come into tight frictional engagement with the upper links at points adjacent the inner ends of the rivets 39, this frictional engagement retaining the seat in folded position and insuring against relative movement between the seat and back while the seat is being carried by means of the handle, but at the same time, this frictional engagement is not so great as to render difficult movement of the seat to the unfolded or open position.

The aforesaid frictional engagement is not sufficient to prevent the seat from being pushed rearwardly past the lever arms 25 and 26, which would permit the seat to be moved to unfolded or open position, but with the bottom of the seat facing upwardly, a condition which is common in virtually every portable folding seat, of which the inventor is aware, and which is a frequent source of annoyance to the user of the seat.

I have therefore provided means for preventing the seat from being pushed rearwardly past the lever arms 25 and 26, when the seat is to be unfolded for use, and at the same time insure that the cushioned portion of the seat is right side up when the seat is unfolded for use. For this purpose, the upper ends of the upper links 38 are provided with lugs 40 which are formed integrally with these links and extend perpendicularly to the normal plane of these links. These lugs 40 are disposed in the path of travel of the heads of the rivets which pivotally connect the lower links 38 with the sides 11 and 12 of the frame 9, and serve as stops or abutments to prevent these rivet heads, and therefore, the seat, from being pushed rearwardly past the lever arms 25 and 26. The provision of these stops or abutments is therefore a fourth important feature of the invention.

Means have also been provided for clamping the seat to a supporting base or seat, such as a wooden bleacher bench, a boat seat, or the like. Such means comprises a pair of spaced bearing plates 41, which are secured to and lie flat against the underside of the base 22, adjacent the front edge of said base, as by means of rivets 42. Each plate 41 is curved or curled at its outboard end to provide a substantially cylindrical housing or bearing for a helical spring 43.

Clamping members, generally designated by reference numeral 44, are provided, each formed from a single piece of heavy gauge wire, which is bent to provide a central U-shaped body portion 45, the normal plane of which is perpendicular to the plane of the base 22, and arms or legs 46 extending from the body portion 45 and disposed in a plane parallel with the plane of the base 22, that is to say, the legs 46 are perpendicular to the plane of the body portion 45.

The outboard legs of the clamping members 44 extend through the helical springs 43. One end 47 of each spring bears against the underside of the base 22, while the other end 48 of each spring is curled around the body portion of each clamping member in such a manner as to normally force the inboard legs of the clamping members in contact with the underside of the base 22 by the pressure of the springs. This is the position occupied by the clamping members when the seat is detached from a support.

When it is desired to clamp the seat to a supporting base, such as a wooden bleacher bench, or boat seat, shown at S, the clamping members 44 are rotated in the springs 43 and against the pressure of these springs until the inboard legs of the clamping members have moved sufficiently to permit the clamping members to embrace the front of such bench or seat, after which the clamping members are released, permitting the inboard legs thereof to firmly engage the underside of the bench or seat.

When the seat is detached from a bench or seat, as described above, and the seat is to be used on a surface or support which cannot be embraced by the clamping members 44 in the manner described, the body portions 45 of the clamping members, since they extend below the plane of the lower edge of the frames 9 and 18, may be utilized as a means to prevent the seat from slipping back on such surface or support, as best shown in Fig. 5.

It will also be noted that the bearing plates 41, in their entirety, the rivets 42, the springs 43, the legs 46 and portions of the body portion 45 of the clamping members 44, are disposed within the frames 9 and 18 and above the plane of the lower edge of the frames 9 and 18. In this respect, the construction is considerably more compact, sturdy and foolproof than that described in my prior Patent No. 2,220,865, and this, coupled with the fact that the body portions 45 of the clamping members serve as a means to prevent the seat from slipping back on a surface to which the clamping members cannot be clamped, even when the inboard legs 46 of the clamping members are in engagement with the undersurface of the base 22, constitutes a fifth important feature of the invention.

It is thus seen that I have provided a portable folding seat which has marked advantages over those disclosed in my prior Patents Nos. 2,220,865 and 2,528,433.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a portable folding seat of the character described, a seat frame comprising a strip of metal providing a front, and sides, the ends of said strip forming the back of the frame, one of said ends extending from the rear edge of one of said sides to a point spaced from the rear edge of the other side, and the other of said ends extending from the rear edge of said other side with a portion thereof overlapping said first-named portion formed in the shape of a carrying-handle.

2. In a portable folding seat of the character described, an inner rectangular seat frame, and an outer frame enclosing said inner frame, said outer frame comprising a strip of metal providing a front and sides, the ends of said strip forming the back of the outer frame, one of said ends extending from the rear edge of one of said sides to a point spaced from the rear edge of the other side, and the other of said ends extending from the rear edge of said other side with a portion thereof overlapping said first-named end, said overlapping portion formed in the shape of a carrying-handle, the ends of said handle being secured to the first-named end of said outer frame and to said inner frame.

3. In a portable folding seat of the character described, a seat frame comprising a single strip of metal of substantially uniform thickness throughout its length, said strip having one end in overlapped relation to the other end, said first end bent to form a carrying handle.

References Cited in the file of this patent

UNITED STATES PATENTS

| | | |
|---|---|---|
| 462,241 | Dow | Nov. 3, 1891 |
| 641,171 | Wagandt | Jan. 9, 1900 |
| 799,538 | Conover | Sept. 12, 1905 |
| 821,990 | Dean | May 29, 1906 |
| 1,783,675 | Roberts | Dec. 2, 1930 |
| 1,802,280 | Schmitt | Apr. 21, 1931 |
| 1,840,275 | Nuberg | Jan. 5, 1932 |
| 2,063,836 | Bromagem | Dec. 8, 1936 |
| 2,151,628 | Deweer | Mar. 21, 1939 |
| 2,220,865 | Hines | Nov. 5, 1940 |
| 2,440,470 | Greitzer | Apr. 27, 1948 |
| 2,466,361 | Bjornskaas | Apr. 5, 1949 |
| 2,514,685 | Virtue | July 11, 1950 |
| 2,528,433 | Hines | Oct. 11, 1950 |

FOREIGN PATENTS

| | | |
|---|---|---|
| 98,523 | Switzerland | Apr. 2, 1923 |
| 148,769 | Germany | Feb. 20, 1904 |
| 293,971 | Great Britain | July 19, 1928 |
| 454,926 | Canada | Mar. 8, 1949 |